United States Patent [19]
Walmsley

[11] Patent Number: 5,324,768
[45] Date of Patent: Jun. 28, 1994

[54] METAL SEALING COMPOSITION

[75] Inventor: Douglas G. Walmsley, Waukee, Iowa

[73] Assignee: Inland Coatings Corporation, Adel, Iowa

[21] Appl. No.: 916,346

[22] Filed: Jul. 17, 1992

[51] Int. Cl.$^5$ .......................... C08J 5/10; C08K 3/40; C08L 25/16

[52] U.S. Cl. .................... 524/494; 524/297; 524/484; 524/485; 524/486; 524/505

[58] Field of Search .............. 427/160, 388.1; 524/494, 297, 484, 485, 486, 505

[56] References Cited

U.S. PATENT DOCUMENTS 4,032,491 6/1977 Schoenke .................. 260/28.5 AS
4,876,130 10/1989 Vonk et al. .................. 428/40

Primary Examiner—Paul R. Michl
Assistant Examiner—U. K. Rajguru
Attorney, Agent, or Firm—Zarley, McKee, Thomte, Voorhees & Sease

[57] ABSTRACT

A coating composition and a method of coating with said composition, with the composition comprising a coating especially suited for sealing metal joints and metal roofs that comprises from about 10% to about 20% of a thermoplastic resin, from about 1.5% to about 3% of a plasticizer, from about 10% to about 20% of a synthetic thermo-plastic rubber, and from about 5% to about 20% of a free flowing silica-alumina glass ceramic filler.

10 Claims, No Drawings

METAL SEALING COMPOSITION

BACKGROUND OF THE INVENTION

Particularly throughout the Midwest, metal roofed buildings and buildings with metal joints have become very common from uses in agricultural and other industries. These buildings, while lightweight and inexpensive to build, do have certain problems from the standpoint of satisfactory weathering, especially in the severe weather extremes of the Midwest. Particularly, in a single year they are subjected to unusually hot temperatures, extreme cold temperatures, and high degrees of moisture. Such metal buildings are therefore susceptible to rusting and corrosion. The buildings are therefore in need of protective coatings on their surfaces, especially at the joints and on the roof.

In the past, joint sealing compositions and roof coverings for metal roofs have been of two particular types, namely, elastomeric latex systems and asphaltic systems. Latex systems have the disadvantage of very poor adhesion, and at the same time they require extensive and time consuming preparation in order for proper application. Because of the extensive time required for proper preparation for application, these steps are often skipped when using elastomeric latexes. As a result the latex is often placed on the metal without proper preparation, thus, increasing the risk of poor adhesion. As a result elastomeric latex compositions especially for roof and metal joint sealing have no been widely accepted.

The other type of system commonly used system is asphaltic emulsions. Asphalt, while less expensive, proves not to be thermally stable under the drastic weather extremes of the Midwest. Thus, it tends to crack in the winter time, and tends to become less viscous and run in the summertime. As a result, it too has significant deficiencies as an effective metal sealant and metal roofing composition.

Yet another problem exists with both asphaltic compositions and latex compositions. This is in regard to their use in treating currently existing metal coverings. That is to say, it often happens that existing roofing compositions and joint sealers, when they become cracked and weathered, need themselves to be covered over. Thus, a good composition is one which will not only adhere to metal, but which can be applied over existing, but unsatisfactory roofing and joint sealing compositions.

The rubberized roofing composition and rubberized seam compound of the composition of the present invention satisfy each of the above needs. In particular, the composition of the present invention has needed flexibility, tensile strength, and adhesion to withstand the expansion and contraction encountered at seams, joints, and penetrations. Also, the composition of the present invention has excellent adhesion to metals, including aluminum, galvanized steel, and painted surfaces, and at the same time, resists cracking and peeling. Compositions of the present invention are also compatible with reinforcing materials such as polyester mesh, can be easily applied using either a troll or a caulking style loader and, because of the coaction of the combination of four later listed critical ingredients, adequately perform in the severe weather extremes of the Midwest.

The composition which achieves all of the above advantages, as well as others, will become apparent from the detailed description of the invention which follows hereinafter.

SUMMARY OF THE INVENTION

This invention relates to a coating composition suitable for sealing metal joints and metal roofs, and is especially useful for recreational vehicles, truck bodies, agricultural buildings, and metal industrial buildings. The composition comprises from 10% to 20% of a thermoplastic resin, from 1.5% to 3.0% of the modifying plasticizer, from about 10% to about 20% of a synthetic thermoplastic rubber which is a two phased polymer consisting of polystyrene domains in a rubbery (ethylene-butylene) matrix and from about 5% to about 20% of a free flowing silica-alumina glass ceramic filler. The most critical portions of the compositions are the synthetic thermoplastic rubber and the free flowing silica-alumina glass filler which coact with the other ingredients to provide the unexpected benefits of the present invention.

DETAILED DESCRIPTION OF THE INVENTION

The composition suitable for sealing metal joints and metal roofs of the present invention comprises, in terms of a detailed listing of the ingredients that are both the broad and preferred ranges, the following detailed composition:

| List of ingredients | Broad Range by weight | Preferred Range by weight |
| --- | --- | --- |
| Aromatic Hydrocarbon | 10%–35% | 25%–30% |
| Light aliphatic Hydrocarbon | 5%–30% | 5%–10% |
| Heavy Aromatic Hydrocarbon | 2%–5% | 2.5%–4% |
| Thickener | .50%–3% | .5%–1% |
| Process Oil | 1.5%–3.5% | 1.5%–2.5% |
| Thermoplastic Hydrocarbon resin | 10%–20% | 12%–18% |
| Thermoplastic Rubber | 10%–20% | 15%–20% |
| Antioxidant | .16%–.40% | .15%–.30% |
| UV Absorber | .16%–.40% | .15%–.30% |
| Pigment | 5%–15% | 5%–10% |
| Alumina-Silica filler | 5%–20% | 10%–20% |
| Minor filler | .50%–3% | .50%–2% |

It is not necessary that the composition in every instance have each of the above ingredients present. It is, however, always necessary that the composition contain the thermoplastic rubber which is a two phased polymer consisting of polystyrene domains in a rubbery polyethylene-butylene matrix all within the percent range specified, and that it also contain the primary filler, which is a silica-alumina glass filler, preferably spherically in shape. This filler is preferably in the shape of strong polysilica-alumina glass ceramic spheres that are chemically inert, thermally stable, and have varying particle sizes, making it ideal for high filler loading. The filler is also of very low oil absorption. Providing that the rubber as described is used with the primary filler as described, the results of the invention can be more or less achieved even while varying the other ingredients. It is, however, critical that these two ingredients be present and have the chemical compositions herein described to allow the coaction to achieve the results of the present invention.

Thermoplastic rubber is a polystyrene and a rubber polyethylene-butylene matrix. It is available from Shell Chemical Co. under the trademark KRATON G -1652. It is described in bulletin SC:39-74. It has a tensile strength of 6,500 PSI, and elongation at break of 500%, a modulus at 300% extension PSI of 730, has a film appearance which is clear water white, and has a solution viscosity at 20% by weight in toluene of 800 cps and at 25% by weight in toluene of 3,800 cps.

The silica-alumina spheres are commercially available from Zeelan Industries, Inc. of 320 Endicot Building, St. Paul, Minn. 55101. They are sold under the trademark ZEEOSPHERES. The silica-alumina glass ceramic spheres are chemically inert and thermally stable. They have a hollow interior and wall thickness that comprises up to two-thirds of their diameter, with a compressive strength of over 60,000 PSI. They have a specific gravity within the range 2.0 to 2.4. Further publicly available information on ZEEOSPHERES may be obtained from Zeelan Industries, Inc. of St. Paul, Minn.

The thermoplastic hydrocarbon resin aides in adhesion development and exhibits very low solution viscosity, thus helping to provide a high solids content. Several different thermoplastic resins may be used satisfactorily, but one which is preferred is Kristalex 3085, sold by Hercules. It is a non-polar, low moleculave weight thermoplastic hydrocarbon polymer derived largely from alpha methylstyrene and is compatible with a wide variety of oils, waxes, alkyds, plastics and elastomers. It is described in Hercules Technical Bulletin no. 7159-6. The plasticizer may be used at the level specified to increase flexibility and slightly decrease the tensile strength. This minimizes shrinkage and some initial lifting problems. A suitable processing oil that may be used as the plasticizer is SUNPAR 110 sold by Sun Refining and Marketing CO. of Philadelphia, Pa. This is a solvent refined heavy paraffinic petroleum oil.

The major filler, that is the alumina-silica glass filler possesses exterior durability, has a very low oil absorption, therefore, allowing for high load levels, and does not diminish or adversely effect elongation and flexibility.

The thermoplastic hydrocarbon resin provides an overall balance of properties.

Providing particularly that both the rubber composition and the filler specified here in are used, the product exhibits superb adhesion with minimal surface preparation and also eliminates the need for primer coats.

A substantial amount of a solvent carrier system can be used, but can vary widely depending upon the conditions required for application. The solvent may be as much as 50% to 60% of the system under some types of applications.

The following example is offered to illustrate but not limit the process of the present invention.

EXAMPLE 1

A composition containing the following ingredients was prepared:

| list of Ingredients | Technical Product Name | % by weight |
|---|---|---|
| Aromatic Hydrocarbon | Xylol | 29.891% |
| Light aliphatic Hydrocarbon | LOLA | 6.631% |
| Heavy Aromatic Hydrocarbon | D150 | 3.834% |
| Thickener | Bentone SD1 | .680% |
| Process Oil | Sunpar 110 | 1.890% |
| Thermoplastic Hydrocarbon resin | Kristalex 3085 | 14.039% |
| Thermoplastic Rubber | Kraton 1652 | 18.961% |
| Antioxidant | Irganox 1010 | .160% |
| UV Absorber | Tinuvin 328 | .160% |

-continued

| list of Ingredients | Technical Product Name | % by weight |
|---|---|---|
| Pigment | TIO2 | 9.066% |
| Filler | Zeeospheres | 14.039% |
| Filler | MP 12-50 | .650% |

This composition when formulated was suitably mixed and applied on the roof and seams of metal grain elevators. The composition was noted to have a high degree of sag resistance and shrinkage was minimized. It was applied to roofing surfaces that had been previously coated with asphalt or latex and was used for patching over other roofing products.

In use, it was noted that the composition adhered well to metal surfaces, when applied to corrugated roofing panels that had been coated with asphalt patching material. When used with the filler as described herein, it was noted to have excellent durability, excellent viscosity, minimized shrinkage, and very low oil absorption. The filler did not diminish adhesion or adversely effect elongation.

Product was applied in some instances by trowel and other instances by a caulking style dispensor. It was overlapped several inches on either side of seams.

For best results, the temperature of the surface and the ambient air was within the range of 40° F. to about 110° F. when applied.

In every instance, even when observed over substantial periods of time, through drastic weather conditions, the product was noted to adhere well to metal surfaces, when applied to corrugated roofing panels that had been coated with asphalt patching material and was noted to have high cohesive strength.

It can therefore be seen that the invention accomplishes at least all of its stated advantages and objectives.

I claim:

1. A coating composition suitable for sealing metal joints and metal roofs, said composition being asphalt free and comprising by weight of the total composite: from about 10% by weight to about 20% by weight of thermo plastic resin, from about 1.5% by weight to about 3.0% by weight of a plasticizer, from about 10% by weight to about 20% by weight of a synthetic thermoplastic rubber which provides excellent tensile strength, elongation, and UV, ozone resistance, and from about 5.0% by weight to about 20% by weight of a silica-alumina free flowing glass filler of low oil absorption.

2. The composition of claim 1 which comprises from about 12% to about 18% of said thermoplastic resin, from about 1.5% to about 2.5% of said plasticizer, from about 15.0% to about 20.0% of said thermoplastic rubber, and from about 10% to about 20% of said free flowing silica-alumina glass filler.

3. The composition of claim 1 which includes a hydrocarbon solvent, an antioxidant, a pigment and an UV absorber.

4. The composition of claim 1 which includes from 10% to about 35% aromatic hydrocarbon solvent carrier, from about 5% to 30% light aliphatic hydrocarbon solvent carrier, from about 2% to about 5% by weight of heavy aromatic hydrocarbon solvent carrier, from about 0.5% to about 3% thickener, from about 1.5% to about 3.0% plasticizer, from about 10% to about 20% thermoplastic hydrocarbon resin, from about 10% to about 20% synthetic thermoplastic rubber, from about 0.15% to about 0.40% anti-oxidant, from about 0.15% to about 0.40% UV absorber, from about 5% to about 15% pigment, and from about 5% to about 20% of free flowing silica-alumina glass filler.

5. The composition of claim 1 which includes from 25% to 35% aromatic hydrocarbon solvent carrier, from about 5% to 10% light aliphatic hydrocarbon solvent carrier, from about 2.5% to about 4% by weight of heavy aromatic hydrocarbon solvent carrier, from about 0.5% to 1.0% thickener, from about 1.5% to 2.5% plasticizer, from about 12% to about 18% thermoplastic hydrocarbon resin, from about 15% to 20% synthetic thermoplastic rubber, from about 0.15% to about 0.30% anti-oxidant, from about 0.15% to about 0.30% UV absorber, from about 5.% to 10% pigment, and from about 10% to about 20% of free flowing silica-alumina glass filler.

6. The composition of claim 5 which includes from about 0.5% to about 3% of additional modifying filler.

7. The composition of claim 1 wherein the thermoplastic hydrocarbon resin is nonpolar, low molecular weight, thermoplastic hydrocarbon polymer derived from alpha-methyl styrene.

8. The composition of claim 1 wherein said plasticizer is a solvent refined paraffinic petroleum oil.

9. The composition of claim 1 wherein said synthetic thermo-plastic rubber is a block copolymer with polystyrene end blocks and a rubber poly(ethylene-butylene) mid-block which is a 2-phase polymer of polystyrene domains in a rubbery poly(ethylene-butylene) matrix.

10. The composition of claim 1 wherein said free flowing silica-alumina glass filler is comprised of hard hollow, silica-alumina glass spheres, which are highly dispersible, light weight free flowing non-reactive extenders.

* * * * *